United States Patent [19]

Terrell et al.

[11] 4,054,871
[45] Oct. 18, 1977

[54] ELECTROMAGNETIC INTRUSION SENSOR

[75] Inventors: James D. Terrell, King George, Va.; Richard O. Giorgis, Olney, Md.

[73] Assignee: The United States of America as represented by the Secretary of the Navy, Washington, D.C.

[21] Appl. No.: 504,625

[22] Filed: Sept. 9, 1974

[51] Int. Cl.² ............................................. G01S 9/42
[52] U.S. Cl. ........................ 343/7.7; 340/258 A; 343/5 PD; 343/8
[58] Field of Search .............. 343/5 PD, 7.7, 8; 340/258 A

[56] References Cited

U.S. PATENT DOCUMENTS

| | | | |
|---|---|---|---|
| 3,176,294 | 3/1965 | Merlo et al. | 343/8 |
| 3,210,752 | 10/1965 | Bojko | 343/5 PD |
| 3,237,191 | 2/1966 | Bojko | 343/5 PD |
| 3,270,339 | 8/1966 | McEuen et al. | 343/5 PD |
| 3,438,020 | 4/1969 | Lerner | 343/5 PD |
| 3,691,556 | 9/1972 | Bloke | 343/5 PD |
| 3,761,908 | 9/1973 | Gehman | 343/5 PD |
| 3,815,130 | 6/1974 | Hayo | 343/5 PD |
| 3,851,301 | 11/1974 | Demers | 340/258 A |
| Re. 25,100 | 12/1961 | Chapin | 340/258 A |

*Primary Examiner*—S. C. Buczinski
*Attorney, Agent, or Firm*—R. S. Sciascia; A. L. Branning; R. E. Bushnell

[57] ABSTRACT

An electromagnetic intrusion sensor for detecting the presence of moving objects within a specified detection range by sensing the interaction between the moving objects and an electromagnetic field generated by the sensor.

29 Claims, 6 Drawing Figures

ELECTROMAGNETIC INTRUSION SENSOR

BACKGROUND OF THE INVENTION

The present invention pertains generally to remote sensors and more particularly to electromagnetic intrusion sensors.

In recent years the use of remote sensors to alert friendly forces to the presence of enemy personnel or vehicular traffic has become widespread. The sensor type which had the lowest cost and has been most commonly employed to date is the seismic sensor. Although these devices have proven to be very useful, they tend to exhibit a high false alarm rate under certain terrain and environmental conditions. Also, their effective range varies widely depending on the surface geology of the implantation site. Magnetic sensors have also been successfully employed and have exhibited very low false alarm rates. However, the range of magnetic devices is quite limited and they only respond to the presence of ferrous metals (which may be advantageous in some application). Both seismic and magnetic sensors are passive devices in that they detect the presence of energy generated by a target. This results in low power drain.

An electromagnetic sensor is an active device which senses the influence of a target on the electromagnetic field generated by the sensor. Its detection range is intermediate between the maximum and minimum range of seismic sensors, and is less influenced by conditions at the implantation site resulting in a low false alarm rate. However since they are active devices they have a high power drain resulting in short term use only at remote sites.

SUMMARY OF THE INVENTION

The present device overcomes the disadvantages and limitations of the prior art by providing low drain electromagnetic intrusion sensor that gives a sharply diminished response to objects moving with its near field (i.e., that sector lying between the sensor antenna and an arc five to ten wavelengths from the antenna). By judicious design of the device, power drain comparable to passive devices can be achieved. The device detects the presence of moving objects within a specified detection range by sensing the doppler effects of a standing wave pattern in an electromagnetic field.

It is therefore an object of the present invention to provide an improved electromagnetic intrusion sensor.

It is also an object of the present invention is to provide an electromagnetic intrusion sensor for use in remote locations for extended periods.

Another object of the present invention is to provide an electromagnetic intrusion device having a low false alarm rate.

Another object of the invention is to provide an electromagnetic intrusion sensor which is small, lightweight, and inexpensive. Still another object of the present invention is to provide an electromagnetic intrusion sensor that gives a sharply diminished response to targets moving within its near field.

Other objects, advantages and novel features of the invention will become apparent from the following detailed description of the invention when considered in conjunction with the accompanying drawings wherein:

DETAILED DESCRIPTION OF THE PREFERRED EMBODIMENT

Figure 1:
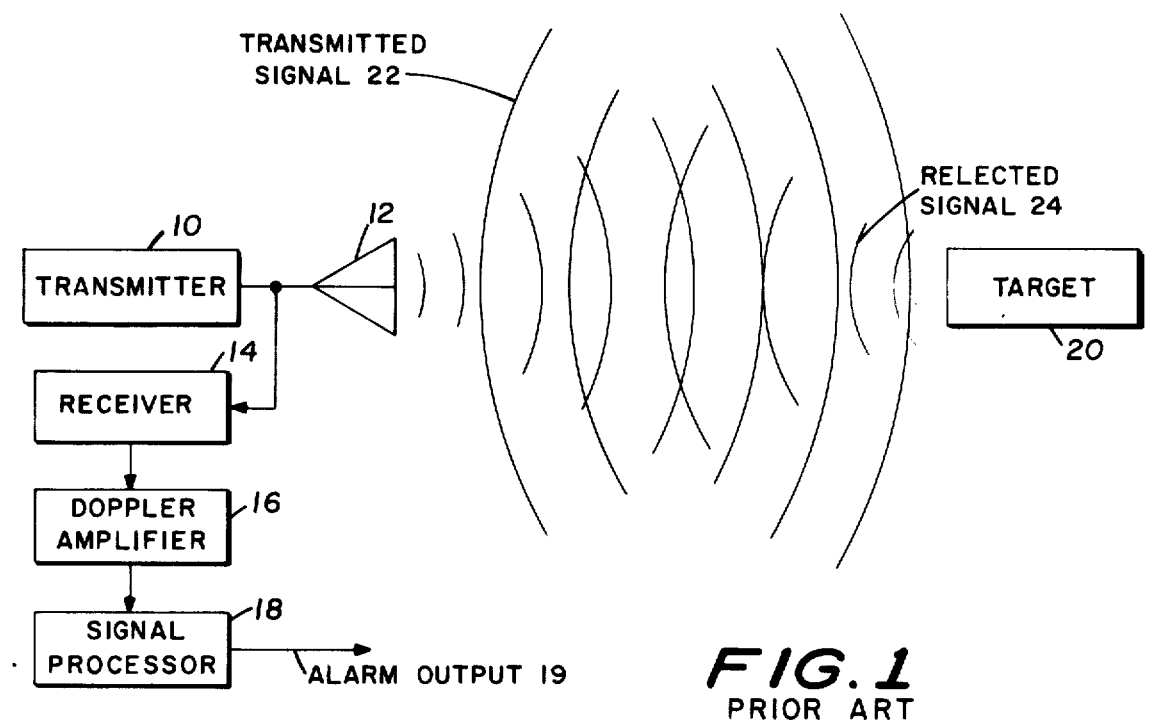
FIG. 1 is a block diagram of a basic electromagnetic sensor.

A simple electromagnetic (EM) sensor known to the prior art is shown in block diagram form in FIG. 1. A radio frequency signal is generated in the transmitter 10 and broadcast from the antenna 12. A portion of this signal is reflected from the target 20 and returned to the receiver. The reflected signal 24 is mixed with the transmitted signal 22 and, if the target 20 is in motion, a doppler signal is produced. The doppler signal is amplified and filtered to exclude all frequencies except those corresponding to the expected range of target velocity. The amplified and filtered signal is fed into a signal processor 18 which extracts further information from the signal. The signal processor 18 produces an alarm output 19 wherever the extracted information indicates the presence of a valid target.

The response of a simple EM detector as described above decreases rapidly with increasing target range. The resulting accentuation in response to nearby targets can cause false alarms when the wind sets foliage close to the antenna in motion. To achieve a system that is practical under general environmental conditions, it is necessary to employ a technique that reduces the response to nearby targets. To design such a system, the nature of received and transmitted signals must be understood.

Both received and transmitted signals are attenuated as they travel. This attenuation can be described by a free space attenuation function. In the far field of the antenna (which for our purpose can be defined as several wavelengths from the antenna) the electric field (E-field) decreases $1/r$, where $r$ is the distance from transmitter to target. Thus, the amplitude of a signal reflected from the target in the far field back to the transmitter is proportional to $1/r^2$ There is likely to be foliage within a wavelength of the sensor, i.e., in the near field. In this region the E-field attenuation function is dominated by $1/r^2$ and $1/r^3$ terms. As a result the attenuation of the signal returned to the sensor from near field targets becomes proportional to $1/r^4$ and then to $1/r^6$ as the distance between the target and antenna decreases.

This accentuation of sensor response to near-field targets, accompanied by the increasing attenuation of response to remote targets with increasing distance emphasizes the need for close range desensitization of the signal received by the sensor. This may be accomplished by designing a sensor such that its response is modified by a close range desensitization function (CRDF). It should be noted that the overall range response of the sensor is determined by the product of the free space attenuation function.

Figure 2:
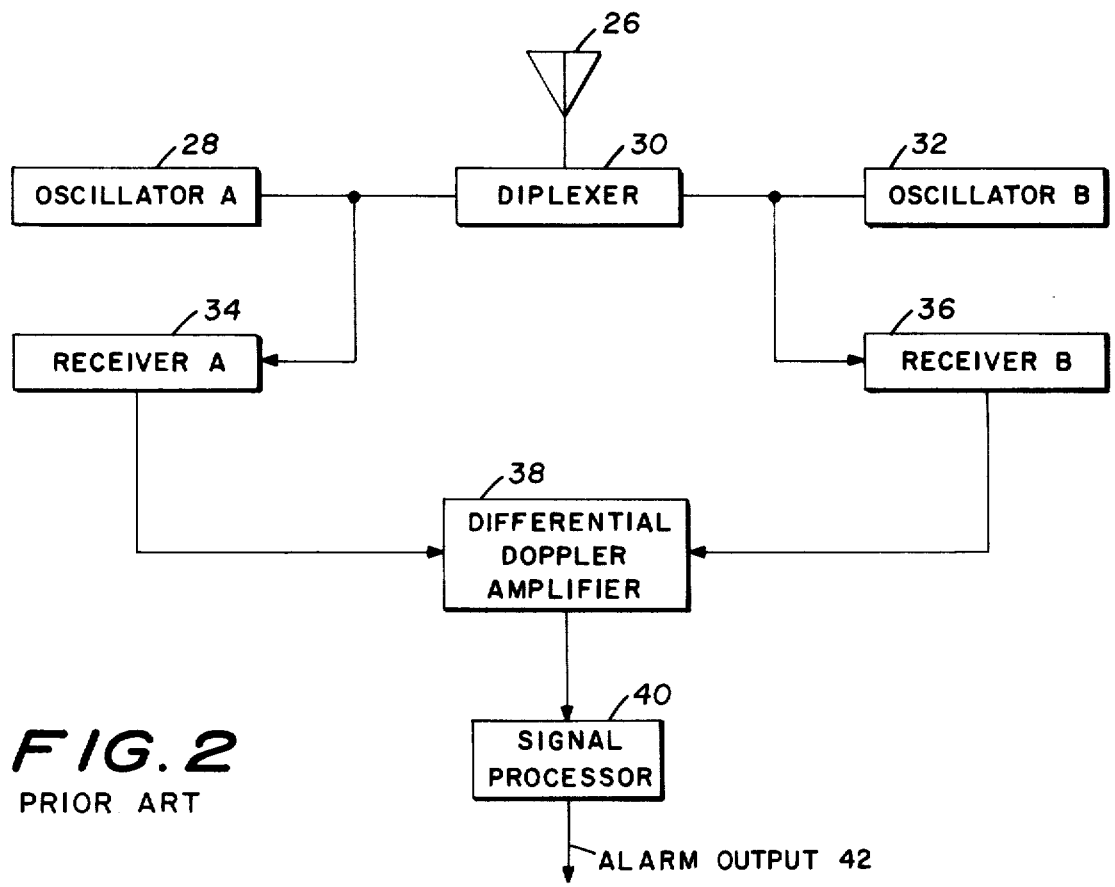
FIG. 2 is a block diagram of a dual frequency electromagnetic sensor.

Most EM sensors generate a CRDF by means of a dual frequency technique as shown in FIG. 2. Two RF frequencies are generated either by two separate oscillators or by switching a single oscillator alternately between two frequencies. The two RF signals are transmitted from a common antenna and demodulated separately. The two doppler signals which result form the inputs to a differential amplifier. A block diagram of such a system is shown in FIG. 2. The response of this type of system is proportional to $$A(r) = \sin \frac{1}{2}(W_1 - W_2)\tau \sin \frac{1}{2}(W_1 + W_2)\tau$$

where:
$W_1$ = frequency of oscillator #1
$W_2$ = frequency of oscillator #2

$$\tau = \frac{2r}{C}$$

(time required for the signal to travel from the sensor to the target and return)
$r$ = sensor to target distance
$c$ = speed of light FIG. 3 discloses a block diagram of the present invention which operates as follows. An amplitude modulated RF signal is generated in the transmitter 46 and fed to the antenna 56 through a delay line 54. The transmitter 46 is pulsed at a rate of 300 pulses per second with a pulse width of approximately 100 μ sec. The carrier frequency is 140 MHz and the modulation frequency is 7 MHz. If a target is present, some of the transmitted energy is reflected back to the antenna 56 and hence back through the delay line 54 to the mixer and modulation frequency amplifier 58. The combined transmitted and reflected signals are mixed and the components at the modulation frequency (7 MHz) are separated out and amplified. Thus the output of the mixer and modulation frequency amplifier 58 is a train of 7 MHz pulses. If no target is present the pulses will be of constant amplitude. If a moving target is present the phase variation of the reflected signal causes the 7 MHz pulses to vary in amplitude at the doppler frequency corresponding to the radial velocity of the target and the carrier frequency. The 7 MHz pulses are video detected and amplified in video-detector and amplifier 60 and fed into a sample and hold circuit 62. In the sample and hold circuit 62, each video pulse charges a storage capacitor to the peak pulse voltage. This voltage is held until the onset of the next pulse when a trigger pulse derived from the pulser 44 causes the storage capacitor to discharge. It then charges to the peak value of the next pulse, holds the value during the off period, is discharged and recharged by the following pulse, etc. Thus the radial velocity of the target is sampled during each pulse and a doppler signal is reconstructed from the samples. The doppler signal is amplified and filtered in a doppler amplifier 64 with a bandpass of 0.3 to 3 Hz. This band corresponds to the expected velocities of a man on foot. When the amplified doppler signal from doppler amplifier 64 swings above a selected threshold in comparator 66, the comparator output 68 switches from a low to a higher amplitude thereby triggering a monostable multivibrator 70. In its stable state the monostable multivibrator output 72 holds a counter 74 in its zero state. When it is triggered by the comparator 68 the monstable 70 "unlocks" the counter 74 and allows succeeding comparator transitions to be registered in the counter. After a period of 15 to 20 seconds the monostable multivibrator 70 returns to its stable state and resets the counter to zero. If four counts are registered by counter 74 during this period, the alarm output 76 is switched from low to high indicating the presence of a target. The initial comparator transition which triggers the monostable multivibrator is not registered in the counter. Therefore the output of the doppler amplifier 64 must swing above the comparator threshold five times within 15 to 20 seconds to produce a target detection output. The system described above differs from other EM sensors in two significant ways.

First, amplitude modulation is used to generate the close range desensitization function (CRDF). With respect to this difference, amplitude modulation produces a more effective CRDF. The system response can be shown to be proportional to:

$$A(r) = aH(r) \sin^2\left(\frac{W_m\tau}{2}\right) \sin W_c\tau$$

where
$W_c$ = carrier frequency
$W_m$ = modulation frequency $$\tau = \frac{2r}{C}$$

$r$ = sensor to target distance
$c$ = speed of light
$a$ = index of modulation, and
$H(r)$ = free space attenuation.

The doppler signal is represented by $\sin W_c\tau$. The CRDF is $$\sin^2\left(\frac{W_m\tau}{2}\right)$$

which has a second order zero at $\tau = 0$. The second order zero in the CRDF results in better rejection of close range targets as compared with the first order zero produced by a dual frequency system.

Second, the transmitter is pulsed which greatly reduces power drain which is an important consideration for remote use over extended periods.

As previously mentioned, EM sensors are by their very nature active devices which generate RF energy and detect the influence of the target on this RF energy. Unfortunately the generation of this RF energy is costly in terms of input power. Seismic and magnetic sensors can be built that will operate with an input power of less than 10 milliwatts. An EM sensor will typically require 30 to 50 milliwatts. The majority of this power is required to generate RF energy. One way to reduce the required input power is to run the transmitter in a pulse mode rather than in continuous wave (CW) mode. The present system is not a pulse system as is commonly found in pulse radar systems but rather an interrupted CW system.

Figure 4:
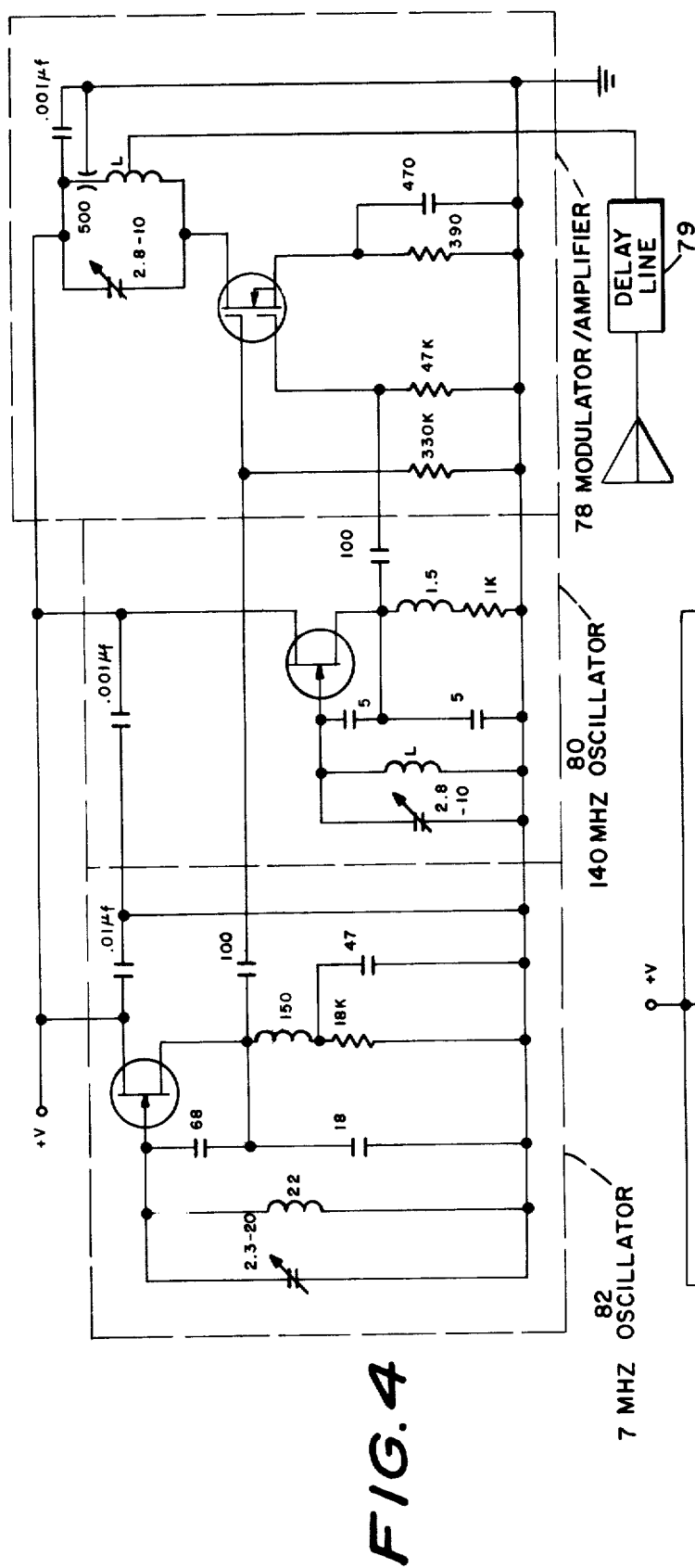
FIG. 4 is a circuit diagram of transmitter for use with the embodiment shown by FIG. 3.

In a standard pulsed radar system the transmitter generates a pulse, then the receiver is turned on to listen for a return signal or echo. In the present interrupted CW system, the signal reflected from the target is received while the transmitter is still on. A schematic of the transmitter 46 is shown in FIG. 4. Both the modulation 82 and RF 80 oscillators are Colpitts designs using junction FET's. FET oscillators are used because they work at lower power levels than bipolar transistor oscillators. The bias resistances were empirically chosen to give the highest operating efficiency. Variable capacitors are used to set the center frequencies of both carrier and modulation oscillators. This is done because it is necessary that the carrier oscillator be set to the center frequency of the antenna and the modulation oscillator be set to its nominal value to provide the proper CRDF.

The modulator/amplifier 78 uses a dual gate MOSFET with the carrier oscillator being fed into one gate and the modulation oscillator being fed into the other gate. This scheme was picked because it is possible to get a clean, nearly 100 percent modulated output at the low output power levels being used. Standard methods of generation an AM signal such as modulated class C amplifiers do not work well with milliwatt output power levels. The bias resistors and the source bypass capacitors are selected to give the best compromise among: output power, modulation purity, and operating efficiency. The double bypass capacitors used on the active devices are used to improve performance and give an extra margin of insurance.

The delay line 79 consists of about 17 feet of miniature coaxial cable (type RF/AU 196) a length sufficient when coupled to the radiating element 56 to give the antenna circuit an electrical length equal to one quarter of the wavelength of the 7 MHz. modulation frequency. Cable was used because it provided a low cost, reliable, simple delay line. The use of a lumped delay line to provide a group delay would be prohibitively expensive and quite large if discreet components were used.

Figure 6:
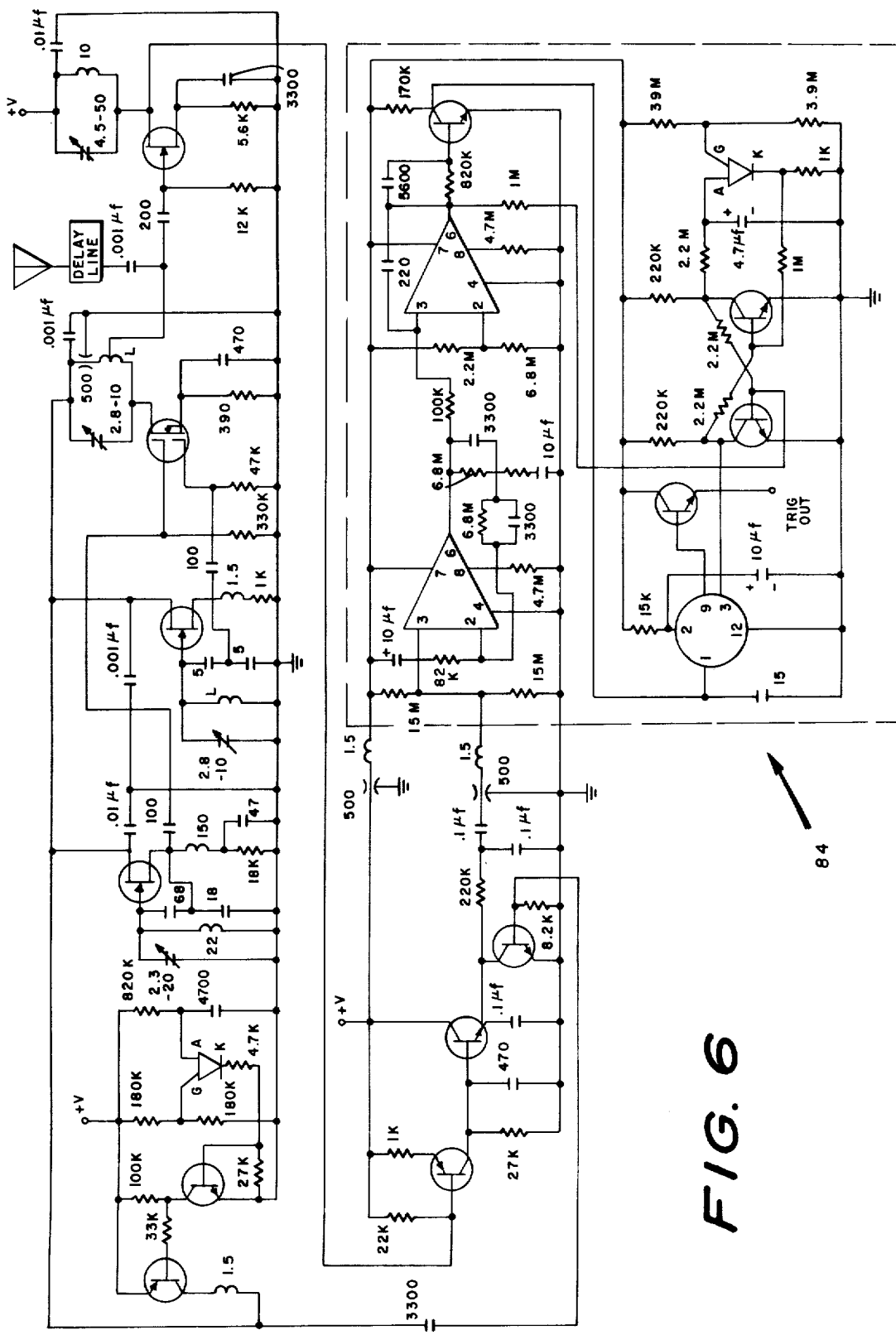
FIG. 6 is an overall schematic diagram of the embodiment shown in FIGS. 3, 4 and 5.

A complete schematic diagram of the entire invention is shown in FIG. 6. The pulser 44 was designed to provide 100 $\mu$ sec, 4 $m_a$ pulses at a rate of 300 Hz to the transmitter 44. The basic time base is provided by a PUT relaxation oscillator. The output from the PUT oscillator drives a two stage NPN-PNP amplifier. These stages provide current gain and pulse shaping. Both transistors are biased to draw current only during a pulse. The pulser standby current drain is only 25 $\mu$ $a$.

A first stage in the receiver section as shown in FIG. 6 is a junction FET which functions as a mixer and 7 MHz amplifier. The receiver input is coupled to the output of the modulator/amplifier 78 in the transmitter 46, FIG. 4. The transfer characteristics of junction FET's make it a good choice for this application. The output of this stage drives a bipolar PNP common emitter amplifier. This stage functions as an envelope detector and amplifier for the 7 MHz pulses from the mixer/amplifier shown as element 58, FIG. 3. It is biased in the off state, drawing current only during a pulse to conserve power. The envelope detected pulses are applied to the sample-hold circuit 62 which consists of an emitter follower, dumping transistor and storage capacitor. Each pulse charges the capacitor through the emitter follower. The capacitor is discharged at the beginning of the next pulse by a shunt transistor which is triggered by the leading edge of the pulser output pulse. The sample-hold circuit is followed by a low pass r-c filter which removes the 300 Hz sampling frequency component from the sample-hold output and acts in conjunction with the doppler amplifier 64 to provide the overall bandpass required. The doppler amplifier 64 consists of a Fairchild $\mu$A 776 operational amplifier employed in the non-inverting mode. This IC provides low current (drain) (approx. 20 $\mu$ $a$), an overall bandpass of 0.3 to 3 Hz, and a midband gain of 76 db.

Figure 3:
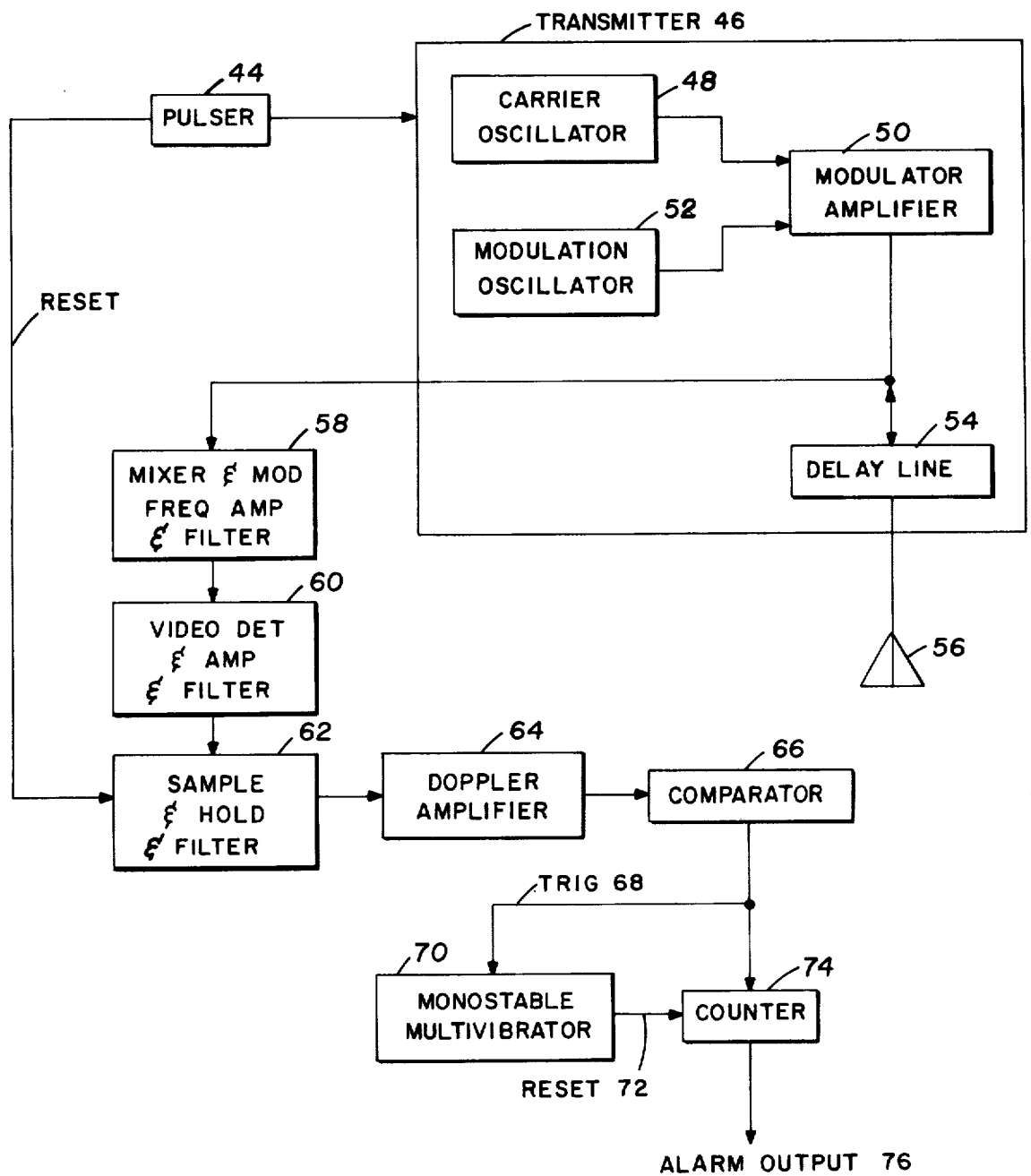
FIG. 3 is a detailed block diagram of an electromagnetic sensor.
Figure 5:
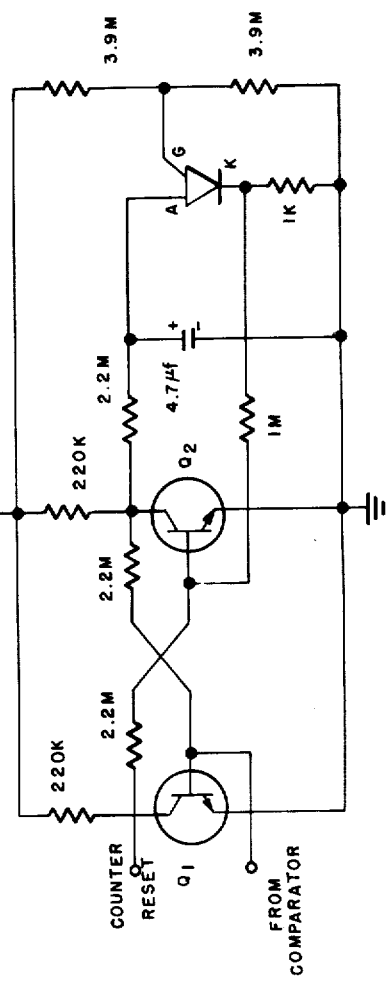
FIG. 5 is a circuit diagram of a monostable multivibrator for use with the preferred embodiment.

The signal processor as shown in FIG. 3 and 6 consists of a voltage comparator 66, digital counter 74, and monostable multivibrator 70. The comparator consists of a $\mu$A 776 op amp. The threshold is established by means of a voltage divider at its inverting input. The doppler amplifier 64 is biased such that its quiescent output voltage is one half of the battery voltage. When a target approaches, the amplifier output swings around this level. When the output swings above the comparator threshold, its output switches from approximately ground to the battery voltage. The comparator 66 drives a transistor stage which decreases the rise and fall times of the comparator output signal 68 insuring proper operation of the digital counter. The counter 74 is an RCA COSMOS IC with rest capability. Its reset line (Pin 3) is connected to a monostable multivibrator 70 shown in FIG. 5 which functions as a time gate. The multivibrator 70 avoids large transients on the power supply line due to the transient current in the timing capacitor during the monostable pulse which has been prevalent in conventional two transistor monostable circuits. These transients could cause the monostable circuit to retrigger at the end of its timing cycle especially after amplification by doppler amplifier 64. To eliminate this problem a monostable circuit consisting of a bistable multivibrator and a PUT was designed as shown in FIG. 5. As shown in FIG. 5, $Q_1$ is normally off and $Q_2$ is normally on. When the comparator switches from low to high voltage, $Q_1$ turns on removing the reset voltage from the counter. $Q_2$ turns off allowing the 4.7 $\mu$ fd capacitor to start charging toward V+ through the 2.2M resistor. When the PUT trigger voltage is reached, the PUT discharges the capacitor through the 1K resistor and applies a positive pulse to $Q_2$ switching the bistable circuit back to its original state and resetting the counter to zero. When the counter registers a count of four (which requires five doppler cycles above the threshold as previously described) its output switches to a high voltage state. The counter drives an emitter follower, capable of delivering a trigger output of greater than 5 volts into a 1K load.

Clearly, the present device provides a viable method of target detection at remote locations. Through the use of intermittent CW operation the device can be used to extended periods in remote locations. In addition the device is operational at intermediate ranges while providing a fairly low false alarm rate.

Obviously many modifications and variations of the present invention are possible in light of the above teachings. It is therefore to be understood that within the scope of the appended claims the invention may be practiced otherwise than as specifically described.

What is claimed as new and desired to be secured by Letters Patent of the U.S. is:

1. An electromagnetic intrusion sensor for use in remote locations for extended periods of time, comprising:
   means for transmitting an electromagnetic signal having a carrier frequency modulated in amplitude at a modulation frequency;
   means for receiving said electromagnetic signal upon reflection from objects moving before said means for transmitting;
   a mixer circuit electrically coupled in common with said means for transmitting and said means for receiving, for producing a third signal by mixing said reflected electromagnetic signal with said transmitted electromagnetic signal;

a filter electrically coupled to said mixer circuit for filtering said third signal by attenuating the carrier frequency components in said third signal;

a detection stage for providing an output signal in dependence upon the envelope of said filtered third signal and, means for detecting variation in amplitude of successive peaks of said output signal components wherein a variation in amplitude thereof represents an intrusion into a standing wave pattern between said transmitted electromagnetic signal and said reflected electromagnetic signal.

2. The electromagnetic intrusion sensor of claim 1 wherein said electromagnetic signal is a continuous wave signal.

3. The electromagnetic intrusion sensor of claim 1 comprising means for pulsing the operation of said means for transmitting, said detection stage, and said means for detecting, by periodically generating pulses whereby the power consumption of the sensor is reduced.

4. The electromagnetic intrusion sensor of claim 1 wherein said variation in amplitude of said standing wave pattern results from a change in phase between said electromagnetic signal and said reflected electromagnetic signal when at least one of said objects is in motion.

5. The electromagnetic intrusion sensor of claim 4 wherein said electromagnetic signal is a continuous wave signal.

6. The electromagnetic intrusion sensor of claim 3 wherein said means for pulsing comprises a device for periodically interrupting the transmission of a continuous wave signal which produces a standing wave pattern.

7. The intrusion sensor of claim 3 wherein said detection stage comprises a box car detector whereby said output signal varies in dependence upon the difference between the amplitude of the modulation frequency of said electromagnetic signal and the amplitude of the modulation frequency of the reflected said electromagnetic signal.

8. The intrusion sensor set forth in claim 3 wherein said output signal comprises a step pulse and said detection stage comprises:

a bipolar common emitter amplifier adapted to receive said filtered third signal from said filter;

first low-pass filter means coupled to the collector terminal of said common emitter amplifier for separating modulation frequency components of said third signal from lower frequency components of said third signal; and, a sample-hold circuit for providing in response to reception of each of said pulses a step pulse having a magnitude dependent upon the peak amplitude of the last occurring of said lower frequency components of the third signal.

9. The intrusion sensor set forth in claim 8 wherein said common emitter amplifier is biased in the OFF state.

10. The intrusion sensor set forth in claim 8 wherein said sample-hold circuit comprises:

an emitter follower having a base terminal adapted to receive said lower frequency components from said low-pass filter;

a charging capacitor coupled to the emitter terminal of said emitter follower;

a dumping transistor having a collector-emitter circuit coupled in parallel with said charging capacitor and a base terminal adapted to receive said pulses.

11. The intrusion sensor set forth in claim 10 further comprising:

second low-pass filter means having a cut-off frequency below the frequency of said periodic pulses, adapted to receive said step pulse provided by said sample-hold stage.

12. The intrusion sensor set forth in claim 11 wherein said means for detecting comprises:

a Doppler amplifier adapted to receive each filtered step pulse from said second low-pass filter means;

a comparator having an input threshold, for generating a logical ONE output state in response to reception of each filtered step pulse from said Doppler amplifier having an amplitude in excess of the threshold; and, a digital counter for initiating an alarm upon the occurence of a predetermined number of said logical ONE output states.

13. The intrusion sensor set forth in claim 12 further comprised of:

said digital counter included a reset circuit; and, timing means sensitive to generation of logical ONE output states by said voltage comparator, for gauging passage of time and for triggering said reset circuit upon expiration of a selected period;

whereby, upon generation of a first of said logical ONE output states said timing means commences gauging passage of time.

14. The intrusion sensor of claim 1 further comprising:

an antenna circuit having an electrical length equal to one quarter of the wavelength of said modulation frequency, coupled in common with said means for transmitting and said means for receiving.

15. The intrusion sensor of claim 14 further comprising said antenna circuit having a single radiating element.

16. An electromagnetic intrusion sensor, comprising:

means for generating an electromagnetic signal having a carrier frequency modulated in amplitude at a modulation frequency;

an antenna circuit having an electrical length equal to one quarter of the wavelength of said modulation frequency, for propagating said electromagnetic signals and for receiving echoes thereof;

a first stage having an input terminal coupled in common with said means for generating and said antenna circuit, for producing an intermediate signal by mixing the components of said electromagnetic signal and said echoes;

a low pass filter having a cut off frequency less than said carrier frequency, coupled to receive said intermediate signal from said first stage; and, a second stage for producing an output signal varying in dependence upon the envelope of said intermediate signal passed by said low pass filter.

17. An intrusion sensor set forth in claim 16 further comprising second filter means for separating modulation frequency components of said output signal from lower frequency components of said output signal.

18. An intrusion sensor set forth in claim 16 further comprising said antenna circuit having a single radiating element.

19. An electromagnetic intrusion sensor, comprising:
   means for generating an electromagnetic signal having a carrier frequency modulated in amplitude at a modulation frequency
   means for pulsing the operation of said means for generating;
   an antenna circuit having an electrical length equal to one quarter of the wavelength of said modulation frequency, for propagating said electromagnetic signal and receiving echoes thereof;
   a first stage having an input terminal coupled in common with said means for generating and said antenna circuit, for producing an intermediate signal by mixing said electromagnetic signal and said echoes;
   filter means for providing paths of differing impedance to said electromagnetic signal and said echoes and to said intermediate signal; and,
   a second stage coupled to receive said intermediate signal from said filter means, for producing an output signal varying in dependence upon said intermediate signal.

20. An intrusion sensor set forth in claim 19 wherein said second stage comprises a box car detector whereby said output signal varies in dependence upon the difference between the amplitude of the modulation frequency of said electromagnetic signal and the amplitude of the modulation frequency of said echoes.

21. An intrusion sensor set forth in claim 19 wherein said means for pulsing provides pulses, further comprising:
   second filter means for separating modulation frequency components of said output signal from lower frequency components of said output signal; and,
   a sample-hold circuit for providing in response to each of said pulses a step pulse having a magnitude dependent upon the peak amplitude of the last said lower frequency components of the output signal.

22. An intrusion sensor as set forth in claim 21 wherein said means for pulsing provides regular periodic pulses of uniform length.

23. An intrusion sensor as set forth in claim 22 further comprising:
   a low-pass filter having a cut-off frequency below the frequency of said periodic pulses coupled to the output terminal of said sample-hold circuit.

24. An intrusion sensor as set forth in claim 23 further comprised of said antenna circuit having a single radiating element.

25. In an electromagnetic sensor of the type including:
   a pulse circuit for providing regular periodic pulses of uniform length;
   a transmitter for generating during said pulses a carrier frequency signal modulated in amplitude at a modulation frequency; and,
   an antenna circuit for propagating the modulated carrier frequency signal and for receiving echoes thereof;
   a network for detecting the presence of Doppler signals, comprising:
   a first mixed circuit reactively coupled in common with said transmitter for providing an intermediate signal by mixing the modulated carrier frequency signal and said echoes;
   a first low-pass filter having a cut-off frequency below said carrier frequency for separating said carrier frequency from said intermediate signal;
   a second stage coupled to receive said intermediate signal from said first low-pass filter, for providing an output signal in dependence upon the envelope of said intermediate signal;
   a second low-pass filter having a cut-off frequency below said modulation frequency for separating modulation frequency components of said output signal; and,
   a sample-hold circuit for providing in response to reception of each of said pulses a step pulse having an amplitude dependent upon the peak amplitude of the output signal during each said pulse.

26. A network of the type set forth in claim 25 further comprising:
   a third low-pass filter having a cut-off frequency below the frequency of said periodic pulses coupled to the output terminal of said sample-hold circuit.

27. A network of the type set forth in claim 26 further comprising:
   a Doppler amplifier adapted to receive each filtered said step pulse from said third low-pass filter;
   a voltage comparator having an input threshold, for generating a logical ONE output state in response to reception of each filtered said step pulse from said Doppler amplifier having an amplitude in excess of the threshold; and,
   a digital counter for initiating an alarm upon the occurrence of a predetermined number of said logical ONE output states.

28. A network of the type set forth in claim 27 wherein said first mixer circuit comprises:
   a junction field-effect-transistor having a drain terminal capacitively coupled to receive the modulated said carrier frequency signal and said echoes.

29. A network of the type set forth in claim 28 wherein said second stage comprises:
   a bipolar PNP type transistor common-emitter amplifier biased in an OFF state;
   whereby said output signal is provided only upon reception of an intermediate signal having an envelope amplitude in excess of a threshold value.

* * * * *